United States Patent
Hirata et al.

(10) Patent No.: US 6,811,137 B2
(45) Date of Patent: Nov. 2, 2004

(54) SOLENOID VALVE (75) Inventors: Ichiro Hirata, Fujisawa (JP); Norio Uemura, Fujisawa (JP); Yoshinari Kasagi, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/466,326

(22) PCT Filed: Jan. 30, 2002

(86) PCT No.: PCT/JP02/00712

§ 371 (c)(1),
(2), (4) Date: Dec. 31, 2003

(87) PCT Pub. No.: WO02/061314

PCT Pub. Date: Aug. 8, 2002

(65) Prior Publication Data

US 2004/0113112 A1 Jun. 17, 2004

(30) Foreign Application Priority Data

| Jan. 31, 2001 | (JP) | ............ 2001-24743 |
| Jan. 31, 2001 | (JP) | ............ 2001-24744 |
| Jan. 31, 2001 | (JP) | ............ 2001-24745 |

(51) Int. Cl.$^7$ ............................................. F16K 31/02
(52) U.S. Cl. ............................. 251/129.15; 251/129.01
(58) Field of Search ....................... 251/129.01–129.22

(56) References Cited

U.S. PATENT DOCUMENTS

| 4,800,912 A | * | 1/1989 | Hafner et al. ............ 137/15.19 |
| 6,305,664 B1 | * | 10/2001 | Holmes et al. ......... 251/129.18 |
| 6,367,434 B1 | * | 4/2002 | Steigerwald et al. ..... 123/90.15 |
| 6,732,999 B2 | * | 5/2004 | Matsusaka et al. .... 251/129.15 |

FOREIGN PATENT DOCUMENTS

| JP | 3-16304 | 2/1991 |
| JP | 3-41179 | 8/1991 |
| JP | 11-006578 | 1/1999 |
| JP | 11-294621 | 10/1999 |
| JP | 2000-120911 | 4/2000 |
| JP | 2000-13688 | 5/2000 |
| JP | 2000-193125 | 7/2000 |

* cited by examiner

*Primary Examiner*—Paul J. Hirsch
(74) *Attorney, Agent, or Firm*—Jacobson Holman PLLC (57) ABSTRACT

A casing member is provided at one end thereof with a bent portion, and when a connector member is inserted from an opening on the other end side of the casing member, the connector member is positioned by the bent portion. Workability in assembling is improved and a burden on various solenoid constituents at the time of assembling can be decreased by sequentially inserting all the various solenoid constituents from the opening on the other end side of the casing member after insertion of the connector member, mounting a valve section after a bracket plate is mounted, and performing caulking with projections for caulking, which are provided on an end of a valve sleeve.

8 Claims, 8 Drawing Sheets

SOLENOID VALVE

This is a nationalization of PCT/JP02/00712 filed Jan. 30, 2002 and published in Japanese.

TECHNICAL FIELD

The present invention relates to a solenoid valve used suitably for pressure control of various fluids or the like.

BACKGROUND ART

Figure 7:
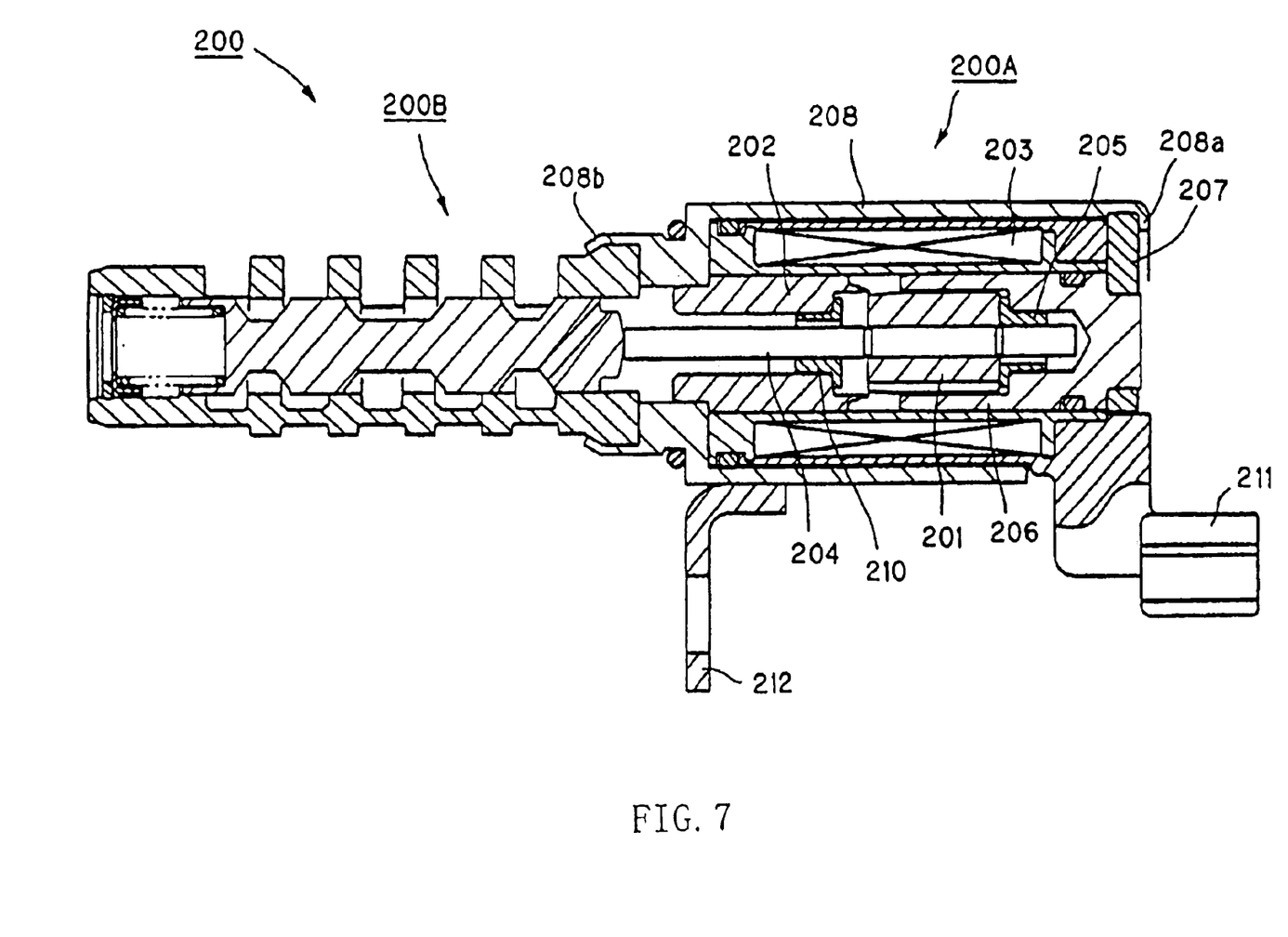
FIG. 7 is a schematic, cross sectional view showing a construction of a solenoid valve of the conventional art.

Conventionally, a solenoid valve of this type is shown in, for example, FIG. 7. FIG. 7 is a schematic, cross sectional view showing a construction of a solenoid valve of the conventional art.

A solenoid valve 200 comprises a solenoid section 200A and a valve section 200B.

Here, the valve section 200B comprises a spool valve constructed such that since an opening area of the valve is varied according to a stroke of a spool, a solenoid controls a stroke amount of the spool to be able to control an amount of inflow and an amount of outflow.

The solenoid section 200A generally comprises a coil 203, a plunger 201 adapted to be magnetically attracted to a center post 202 upon energization of the coil 203, and a rod 204 connected to the plunger 201 to transmit driving of the plunger 201 to the valve section 200B (concretely, the spool), a casing member 208, into which various solenoid constituents are incorporated, and a connector 211 for feeding electricity to the coil 203.

Also, a first bearing 205 and a second bearing 210 for increasing a coaxiality of the plunger 201 and the rod 204, which reciprocate, are provided, and the rod 204 fitted into the plunger 201 is supported by the bearings 205, 210, one of the bearings 205 being supported by a sleeve 206. The other of the bearings 210 is supported by the center post 202. Also, provided are an upper plate 207, which forms a magnetic path, and the like.

Here, the plunger 201 is configured to be positioned in a direction away from the center post 202 in a normal state, that is, a state, in which electricity is not fed to the coil 203.

In addition, generally, a biasing member such as springs, or the like, biases the plunger 201 in a direction away from the center post 202. In an example shown, a spring for biasing the spool toward the solenoid section 200A is provided whereby the plunger is spaced away from the center post 202 through the spool.

So, electricity is fed to the coil 203 to thereby form a magnetic path, so that the plunger 201 is magnetically attracted to the center post 202.

Accordingly, magnetic forces can be controlled according to a magnitude of current fed to the coil 203, so that an amount of movement of the plunger 201 is controlled to enable controlling an amount of stroke of the spool, thus enabling controlling a flow rate of a fluid, pressure control, such as hydraulic control, of various fluids, or the like.

Here, the solenoid valve 200 of the conventional art is assembled by suitably incorporating various solenoid constituents, which include the plunger 201 and the center post 202, in a hollow portion of the substantially cylindrical-shaped casing member 208 from both end sides of the casing member 208 according to shapes, or the like, of the respective member, thereafter caulking a caulked portion 208a, which is provided on one end side of the casing member 208, on an end of the upper plate 207 and further caulking a caulked portion 208b, which is provided on the other end side, on an end of the valve section 200B (however, the caulked portion 208a is not always caulked first in a caulking order).

Hereupon, in the case where the connector 211 is of a type to be arranged in a portion of a rear end of a solenoid valve body in a circumferential direction as in the solenoid valve 200 of the conventional art shown in FIG. 7, there is involved a disadvantage that interchangeability is bad since the positional relationship between the connector and a bracket 212 for mounting the solenoid valve body in a predetermined mount position must be modified according to a mount location.

Figure 9:
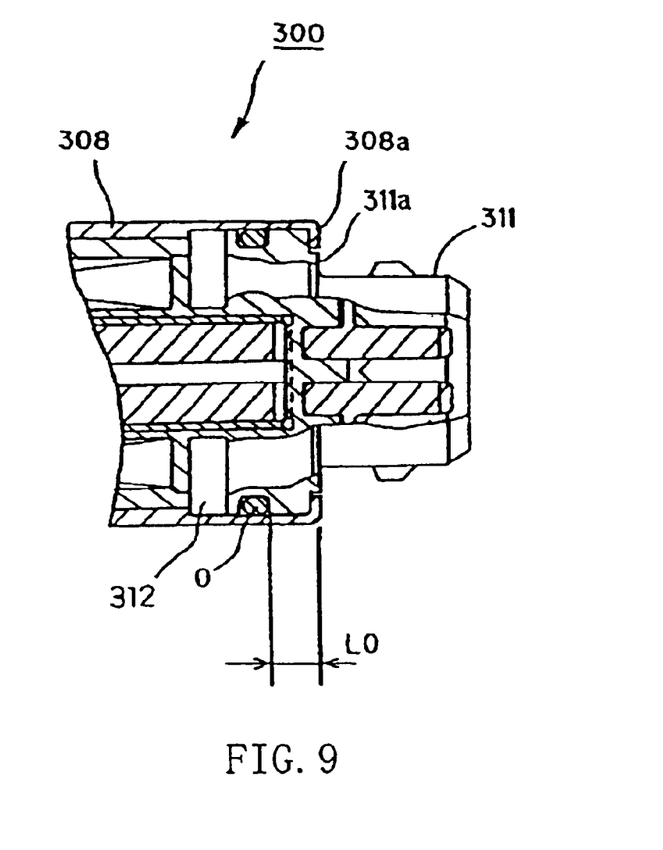
FIG. 9 is a schematic, cross sectional view showing a construction of a solenoid valve of the conventional art.

Here, in order to improve interchangeability, there is known a type, in which a connector 311 is disposed on a rear end of a body of a solenoid valve 300 to project outside from one end of a casing member 308 as shown in FIG. 9.

In this case, since the connector 311 is structured to project outside from one end of the casing member 308 to be disposed on an axis, there is no need of taking account of the positional relationship between the connector and a bracket, which makes interchangeability excellent.

In the case of this type, assembly is performed by forming a step portion 311a on the connector 311, which is molded by insert molding of a connector terminal, and caulking a caulked portion 311a, which is provided on one end of the casing member 308, on the step portion 311a.

Here, since that portion, in which a metallic upper plate 312 is formed integral with a resin material, involves a relative difference in coefficient of linear expansion between the resin and the metal, a gap is liable to be produced due to repeated thermal expansion and contraction (temperature change).

Also, that portion, in which the resin is fixed by caulking of the casing, is liable to generate a gap because the caulked portion is partially strained.

Therefore, a seal ring O is provided in order to prevent water from entering into a coil from outside through the gap to generate such malfunction as short circuit, or the like.

DISCLOSURE OF THE INVENTION

As described above, with the solenoid valve of the conventional art, various solenoid constituents must be assembled into the casing member 208 from both sides thereof, and so the casing member 208 must be suitably reversed in the assembling process, which causes an increase in manhour for assembly and complexity in the assembling work.

Also, since various solenoid constituents must be assembled from the both sides, a caulking processing is necessary in two locations on the both sides in order to provide fixing of the various constituents.

In addition, in the case where a seal ring is to be assembled to an inner periphery of the casing member, when the seal ring remains long in a state, in which it slides on and contacts with an inner periphery of the casing member, at the time of assembly, there is a fear that abrasion of the seal ring and worsening of a mount state, such as distortion of the seal ring, are caused to degrade the sealing performance, and so there is a demand for prevention of such matter.

Also, accuracy in inner diameter and accuracy in surface condition are demanded for those portions, against which the seal ring abuts, and an outer periphery of the upper plate consituting a magnetic flux feeding portion abuts, in an inner peripheral portion of the casing.

Also, the above conventional art involves a problem that bearings cause shaft deviation to lead to lowering of accuracy in coaxiality. Here, coaxiality means positional accuracies of a plunger and a rod, which move reciprocatingly in an axial direction. That is, the closer to a central axis of the whole solenoid valve axes of a plunger and a rod making reciprocation, the higher these accuracies. Such coaxiality is determined by positional accuracies among respective members, and in particular, when bearings cause shaft deviation, accuracy in coaxiality is lowered.

In this manner, when bearings cause shaft deviation and accuracy in coaxiality is lowered, a plunger and a rod are increased in sliding resistance, which is responsible for degradation in function, such as generation of hysteresis, or the like.

As the reason for causing shaft deviation, it is first cited that a caulked portion is near a portion, by which an outer periphery of the plate is held.

That is, the casing is liable to be susceptible of deformation in the vicinity of the caulked portion, and that member, on which load of caulking is applied, becomes liable to be susceptible of positional deviation.

Meanwhile, the plate is generally a member that affects positional accuracies of various constituents constituting a solenoid much. This is because a sleeve and the like are joined integrally to the plate and the plate positions bearings through other several members. Also, the plate is positioned with its outer periphery abutting against an inner periphery of the casing.

Accordingly, when the plate is disposed in the vicinity of that portion, which is subjected to caulking, positional deviation is increased due to deformation of the casing and load of caulking with the result that there is caused shaft deviation.

Also, as the reason for causing shaft deviation, it is second cited that the configuration does not define a position, in which a portion being caulked is bent.

More specifically, while caulking is conventionally performed by caulking an entire circumference of an end of a casing, or providing a projection for caulking to caulk the same, a position, in which a portion being caulked is bent, depends only on a jig (metallic die for caulking) for carrying out caulking.

Accordingly, since a metallic die for caulking generally has a portion, of which inner surface is in the form of a curved surface, pressing against a caulking projection, or the like, to perform caulking so that a portion being caulked is smoothly bent, the portion being caulked is liable to bulge at its root.

Accordingly, when the plate is present on such bulged portion, a gap is generated between an outer periphery of the plate and an inner periphery of the casing, and so the plate becomes liable to make deviation with the result that shaft deviation is increased.

These points will be concretely explained taking as an example the solenoid valve shown in FIG. 7.

The solenoid valve shown in FIG. 7 is configured such that the caulked portion 208a is caulked on the end of the upper plate 207 as described above. Accordingly, a root of the caulked portion 208a is liable to be deformed in a bulging manner, and the upper plate 207 is directly acted by load of caulking to be liable to cause positional deviation.

Meanwhile, the sleeve 206 is joined integrally to the upper plate 207 and supports the bearing 205. Accordingly, when the upper plate 207 causes shaft deviation, the bearing 205 also causes shaft deviation, so that accuracy in coaxiality is lowered.

Also, there is also caused a further problem that spring back is generated at the caulked portion and therefore no adequate fixing force for caulking is obtained.

Figure 8:
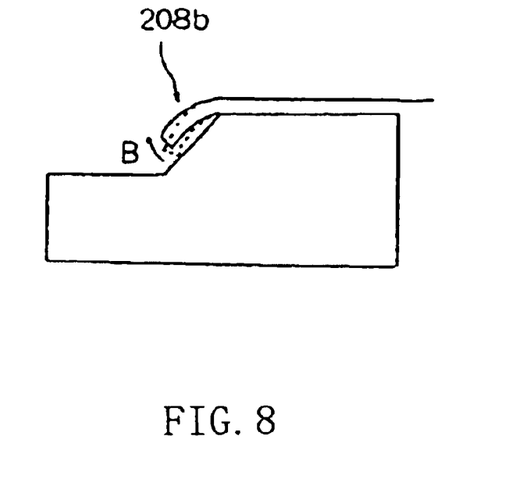
FIG. 8 is an enlarged view showing a part of FIG. 7.

Such matter will be explained with reference to FIG. 8 showing an enlarged view of the caulked portion 208b in FIG. 7.

Generally, caulking is performed by bending a tip end of a caulked portion up to a position, in which it abuts against a wall surface of a mating-member. That is, in the example shown, a tip end of the caulked portion 208b is bent up to a position, in which it abuts against an outer wall surface of the valve section (portion shown by a dotted line in FIG. 9).

Since the casing is metallic, however, the caulked portion 208b is deformed to be returned a little to an original by its elastic righting force, that is, spring back is generated.

In this manner, since the tip end of the caulked portion 208b causes spring back in a direction of an arrow B in FIG. 8 to be deformed up to a position shown by solid lines after caulking is performed, there is in some cases generated a gap and not obtained an adequate fixing force for caulking.

Accordingly, in the case where an adequate fixing force for caulking is not obtained, various constituents are inadequately positioned, which is responsible for degradation in function.

Further, with the constitution of the solenoid valve of the conventional art shown in FIG. 9, load of caulking is applied on the resin material among the various solenoid constituents, deformation is liable to be generated, which is also responsible for worsening of positional accuracies between the respective members.

Accordingly, with the solenoid valve 300 shown in FIG. 9, it is necessary to take adequate account of a burden on the resin material, on which load of caulking is applied, and so a wall thickness L0 from the groove, in which the seal member O is mounted, to the end surface must be made sufficiently large.

The present invention has been thought of in order to solve the problems of the conventional art, and has its object to provide a solenoid valve, in which improvement in assembling work and quality is achieved.

To attain the object, the invention provides a solenoid valve including a substantially cylindrical-shaped casing member having on one end side thereof a bent portion, which is bent inside, a connector member adapted to be inserted into a hollow interior of the casing member from other end side thereof, and having a stepped portion positioned on the bent portion, the connector member having a connector portion projecting outside from the one end side of the casing member, various solenoid constituents adapted to be sequentially inserted into the hollow interior of the casing member from other end side thereof after the connector member has been inserted, and a valve adapted to be mounted after the various solenoid constituents have been inserted, the solenoid valve being characterized by having projections for caulking, by which the valve and the various solenoid constituents are mounted in a state, in which the valve is mounted on the other end of the casing member.

Accordingly, it suffices to assemble all the various solenoid constituents from the other end of the casing member, the process of reversing the casing member in the assembling processing is made unnecessary, and it suffices to perform caulking only in one location. Also, since the connector section is constructed to project outside from one end side of the casing member, the positional relationship in a direction of rotation involves freedom as compared with that arrangement, in which a connector is provided on an outer peripheral surface of a casing member, which makes interchangeability excellent. Further, since caulking is performed only on the other end of the casing member, a burden of load on the connector member disposed on one end side is small at the time of caulking. Also, since caulking is performed by the projections for caulking, deformation near a portion being caulked is small as compared with the case where caulking is performed over an entire periphery of the end.

The valve is preferably provided with a first corner for prescribing a position, in which the projections for caulking begin bending at the time of caulking, and a second corner adapted to be pressed by those inner peripheral surfaces of the projections for caulking, which are bent by the first corner.

Thereby, the first corner is provided on the valve to prescribe a position, in which the projections for caulking are bent, and the second corner is provided to be pressed by the projections for caulking, so that an adequate fixing force for caulking is obtained. Also, even when spring back causes tip ends of the projections for caulking to be separated from the wall surface of the valve, the second corner remains pressed, so that an adequate fixing force for caulking can be maintained.

The projection for caulking is preferably provided with a groove, which extends near the first corner from a tip end of the projection.

Thereby, the projections for caulking are smoothly bent near the first corner.

It is preferable that a bracket plate, in which a bracket for mounting a solenoid valve body to a different element, and a plate provided on a side of the valve for forming a magnetic path between the casing and the solenoid constituents are formed integrally, is provided, one end of the valve portion abuts against one surface of the bracket plate and a portion of an end edge of the casing on the other end side thereof abuts against the other surface of the bracket plate, and the projections for caulking effect assembling of the various solenoid constituents and the valve in a state, in which an inner peripheral surface of the casing extends along and abuts against at least a part of an outer peripheral, curved surface of the bracket plate, or in a state, in which the inner peripheral surface of the casing extends along and abuts against at least a part of an outer peripheral surface of the valve, or in a state, in which the inner peripheral surface of the casing extends along and abuts against both of at least a part of the outer peripheral, curved surface of the bracket plate and at least a part of the outer peripheral surface of the valve.

Here, "formed integrally" means a configuration, in which a plurality of parts (in this case, the bracket and the plate) are joined to a member by means of welding, caulking, concave and convex fitting, or the like, or a configuration, in which a member (for example, a sheet of steel) is formed into a part by means of press, or the like.

Accordingly, since inner peripheral surfaces of the projections for caulking are caulked while abutting along with at least a part of the outer peripheral, curved surface of at least one of the bracket plate and the valve section, backlash in a diametrical direction is prevented (prevent out of centering). Also, since caulking is performed only on a side, on which the valve section is mounted, it is unnecessary to perform caulking in the vicinity of the outer periphery of the bracket plate, so that shaft deviation on the bracket plate can be decreased. Thereby, the respective members are good in positional accuracy to maintain coaxiality even in the case of performing caulking.

Preferably, the bracket plate and one end of the valve are put between the projections for caulking and a portion of an end edge of the casing on the other end side, whereby the various solenoid constituents, bracket plate and the valve are assembled.

Thereby, a load of caulking when caulking is performed is imposed only on the plate, one end of the valve, and the casing.

Preferably, a seal ring adapted to come into close contact with the inner peripheral surface of the casing on one end side of the casing to effect sealing is provided, and the casing comprises a small-diameter portion defined by a region, which is disposed on one end side of the casing and includes a portion adapted to be closely contacted by the seal ring, and a large-diameter portion, which is disposed toward the other end from the small-diameter portion of the casing and does not contact with an outer peripheral surface of the seal ring.

Thereby, the large-diameter portion does not contact with the seal ring when the connector member is mounted. Also, that portion (small-diameter portion), with which the seal ring comes into close contact, and for which a comparative accuracy is demanded, can be limited partially. That is, there is no need of enhancing dimensional accuracy or the like for the whole casing member, and so it suffices that the large-diameter portion is rough in accuracy while only the small-diameter portion is high in accuracy.

Preferably, the casing comprises a cylindrical portion, of which an inner peripheral surface defines a substantially perfect circle, and the seal ring is mounted on an inner periphery of the cylindrical portion.

Thereby, airtightness is preferably kept in the casing.

Preferably, the solenoid constituents include an upper plate, of which an end abuts against the inner peripheral surface of the casing and which forms a magnetic path, and an end of the upper plate abuts against an inner peripheral surface of the small-diameter portion of the casing.

Thereby, that portion, against which the upper plate abuts, abuts against that portion (small-diameter portion), which is limited partially, and for which a comparative accuracy is demanded. Thereby, there is no need of enhancing dimensional accuracy or the like for the whole casing member, and so it suffices that the large-diameter portion is rough in accuracy while only the small-diameter portion is high in accuracy.

BEST MODE FOR CARRYING OUT THE INVENTION

Preferred embodiments of the invention will be exemplarily described below in detail with reference to the drawings. However, a scope of the invention is not to be limited only to dimensions, materials, configurations, and relative positions of constituent parts described in the embodiments unless otherwise specifically described.

Figure 1:
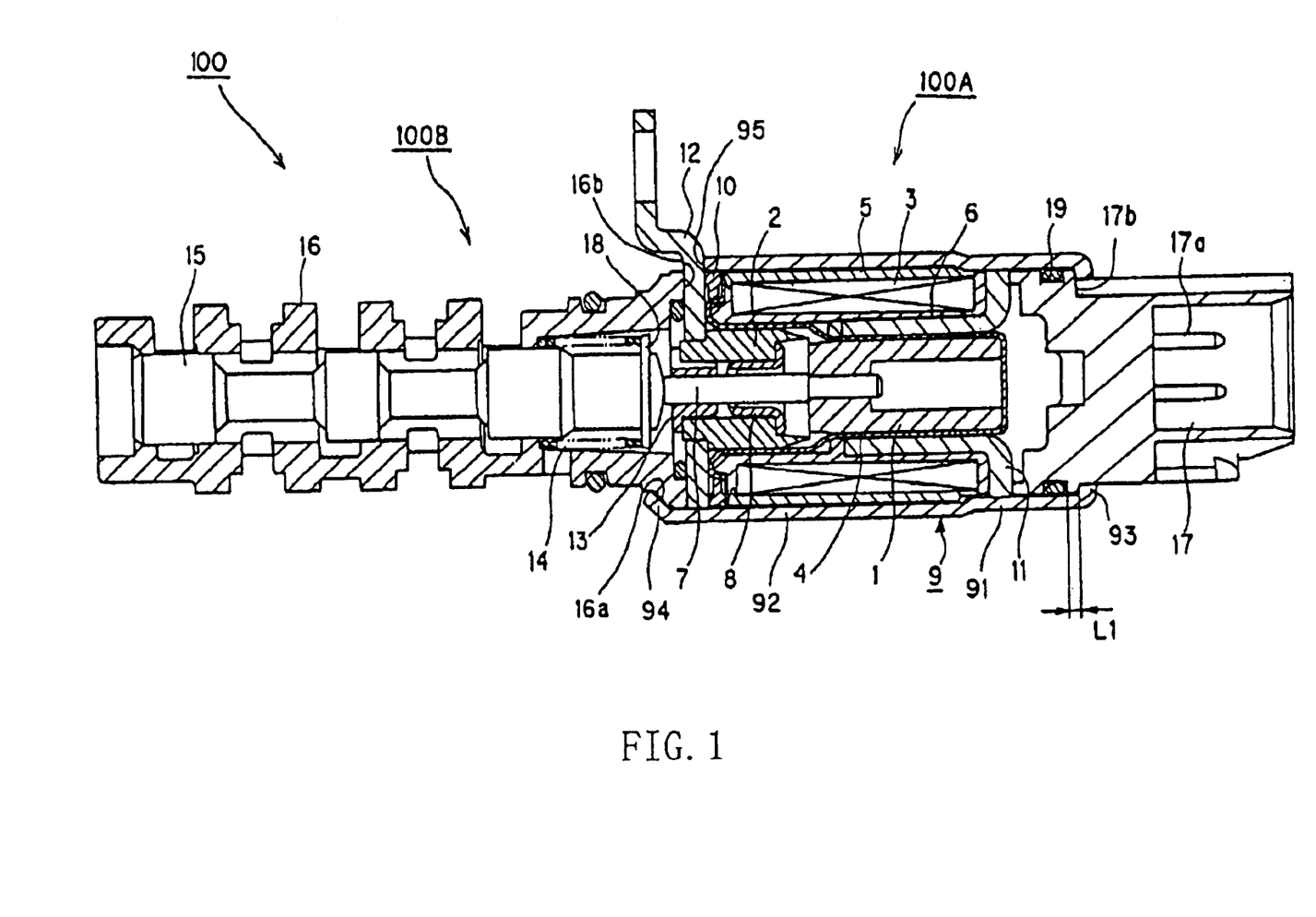
FIG. 1 is a schematic, cross sectional view showing a constitution of a solenoid valve according to an embodiment of the invention.
Figure 2:
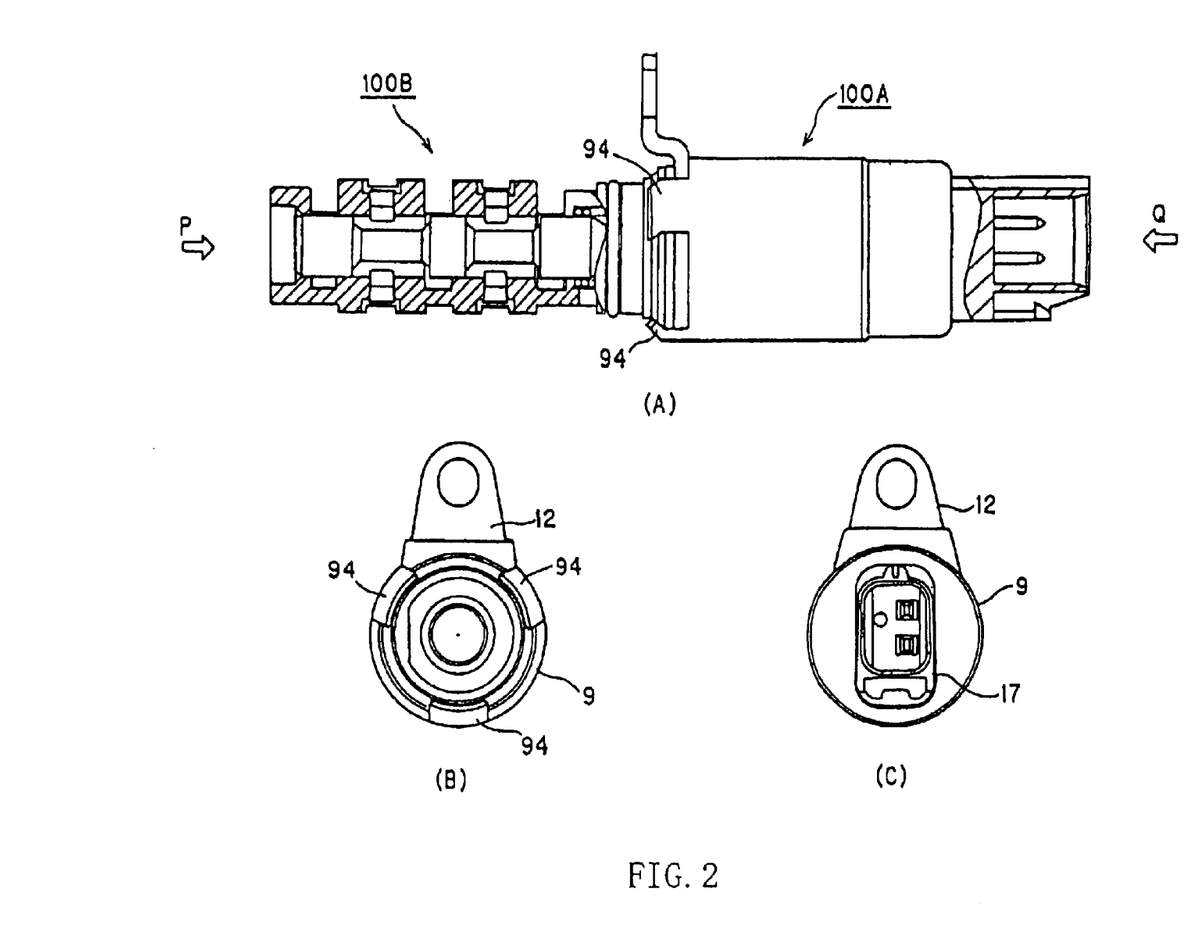
FIG. 2 are schematic views showing a constitution of the solenoid valve according to the embodiment of the invention.

A solenoid valve according to an embodiment of the invention will be explained with reference to FIGS. 1 to 6. First, an outline of a solenoid valve according to the embodiment of the invention will be explained as a whole with reference to FIGS. 1 to 2. FIG. 1 is a schematic, cross sectional view showing a constitution of a solenoid valve according to the embodiment of the invention, and FIG. 2 are views of a configuration of the solenoid valve according to the embodiment of the invention ((A) is a partially broken away, cross sectional view, (B) is a view of an outline as viewed from a P direction in (A), and (C) is a view of an outline as viewed from a Q in (A)).

A solenoid valve 100 comprises a solenoid section 100A and a valve section 100B.

Here, the valve section 100B comprises a spool valve, and a spool 15 is provided in a valve sleeve 16, which constitutes a valve section body, to be able to reciprocate therein. Since an opening area of a valve formed in the valve sleeve 16 is varied according to a stroke of the spool 15, a solenoid controls a stroke amount of the spool 15 to be able to control an amount of inflow and an amount of outflow of a fluid.

The solenoid section 100A generally comprises a coil 3, a connector member 17, into which terminals 17a are insert-molded to be electrically connected to the coil 3 for feeding of electricity, a plunger 1 adapted to be magnetically attracted to a center post 2 upon energization of the coil 3, a rod 7 connected to the plunger 1 to transmit driving of the plunger 1 to the spool 15, and a casing member 9, into which various solenoid constituents (the coil 3, the center post 2, and so on) are incorporated.

Also, provided are a sleeve 4 serving as a bearing for the plunger 1, a bobbin 6, around which the coil 3 is wound, a shim 8 for facilitating separation of the plunger 1 from the center post 2, a packing 10 for preventing leakage of a fluid to a side of the coil 3 from an interior of the valve section 10B, an upper plate 11, which forms a magnetic path, and a bracket plate 12, which also forms a magnetic path and serves to fix a solenoid valve body in a predetermined position (other constituents).

Further, provided are a bearing 13 for the rod 7, and a spring 14 for biasing an E-type ring 18 fixed to the spool 15 to thereby bias the plunger 1 in a direction away from the center post 2 through the rod 7 together with the spool 15.

In addition, the coil 3 and the bobbin 6 are molded to be assembled to constitute a mold coil sub-Assy 5.

Here, the plunger 1 is configured to be positioned in a direction away from the center post 2 in a normal state, that is, a state, in which electricity is not fed to the coil 3, that is, the spool 15 in the embodiment is biased in a direction toward the solenoid section 100A through the E-type ring 18 whereby the plunger 1 is separated from the center post 2.

So, electricity is fed to the coil 3 whereby the coil 3 generates a magnetic field to form a magnetic path (a magnetic path formed by the casing member 9, upper plate 11, plunger 1, center post 2, and the bracket plate 12), so that the plunger 1 is magnetically attracted to the center post 2.

Accordingly, magnetic forces can be controlled according to a magnitude of current fed to the coil 3, so that an amount of movement of the plunger 1 is controlled whereby it is possible to control an amount of stroke of the spool 15, thus enabling controlling a flow rate of a fluid, pressure control, such as hydraulic control, of various fluids, or the like.

Subsequently, an explanation will be given to a built-up construction of the solenoid valve according to the embodiment.

With the solenoid valve 100 according to the embodiment, the connector member 17 is structured to project outside from one end side (rear end side) of the casing member 9 to be disposed on an axis, in order to make the positional relationship thereof with the bracket irrespective in a circumferential direction to realize an excellent interchangeability.

Here, the casing member 9 is substantially cylindrical-shaped (a substantially whole region except that portion, on which a projection 94, described later, for caulking is provided, is cylindrical-shaped over an entire circumference), and has on one end side thereof an inwardly bent portion 93. The bent portion 93 has been provided when forming processing of the casing member 9 is carried out, and is different from that in the conventional art, in which caulking is effected.

Meanwhile, the connector member 17 comprises a stepped portion 17b having a larger diameter than that of an outwardly projecting portion, and when inserted from an opening on the other end side of the casing member 9, the stepped portion 17b is caught by the bent portion 93 to be positioned.

Dimensions and shapes of respective constituents are set so that after insertion of the connector member 17 in this manner, all the various solenoid constituents can be sequentially inserted from the opening on the other end side of the casing member 9, and in the example shown, for example, the mold coil sub-Assy 5, sleeve 4, a pre-assembly of the plunger 1 and the rod 7, packing 10, and a pre-assembly of the shim 8, center post 2, bearing 13, and the bracket plate 12 are mounted.

Here, the casing member 9 is provided, on an end opposed to the bent portion 93, with a projection 94 for caulking. In addition, FIG. 1 shows a state after caulking is performed.

And, one surface of the bracket plate 12 is configured to abut against an end edge in a region not provided with the projection 94 for caulking.

Also, an end 16b of the valve sleeve 16, which constitutes a body of the valve section 100B, is configured to abut against the other surface of the bracket plate 12 when the valve section 100B is mounted after the bracket plate 12 is mounted.

In this state, the projection 94 for caulking is caulked on a stepped portion 16a of the valve sleeve 16, which constitutes a caulked portion, whereby the solenoid constituents, the bracket plate 12, and the valve section 100B are positioned and fixed to complete assembly.

Since caulking is effected by means of the projection 94 for caulking in this manner, deformation of the outward form of the casing member can be reduced as compared with the case where a casing is caulked over an entire circumference on an end thereof. Accordingly, even when the casing member is large in wall thickness, it is possible to preferably perform caulking without cutting such as cutting a wall thin.

An explanation will be given in more detail to the caulking process with reference to FIGS. 3 to 6.

Figure 3:
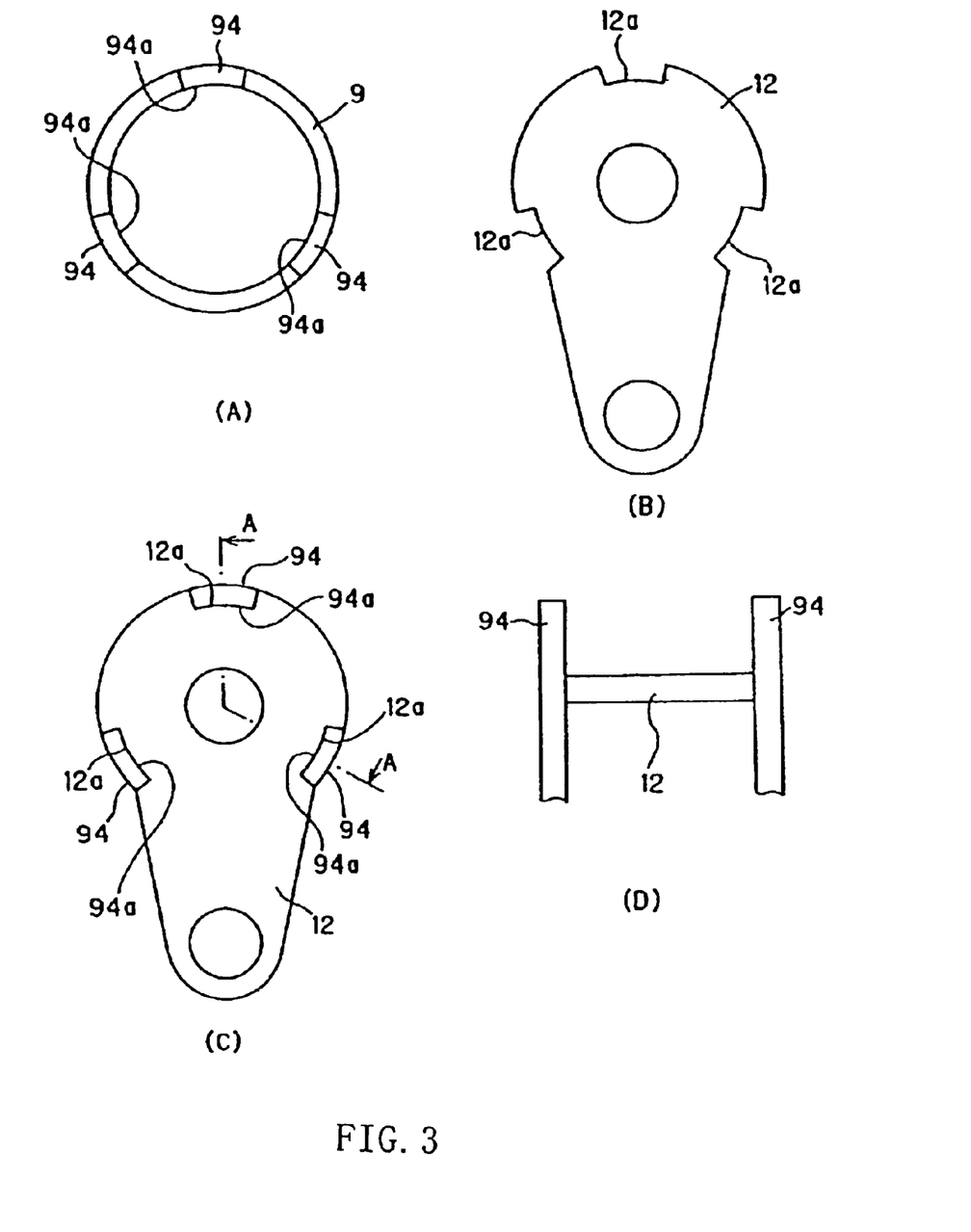
FIG. 3 is a schematic view illustrating mounting of a casing member and a bracket plate.
Figure 4:
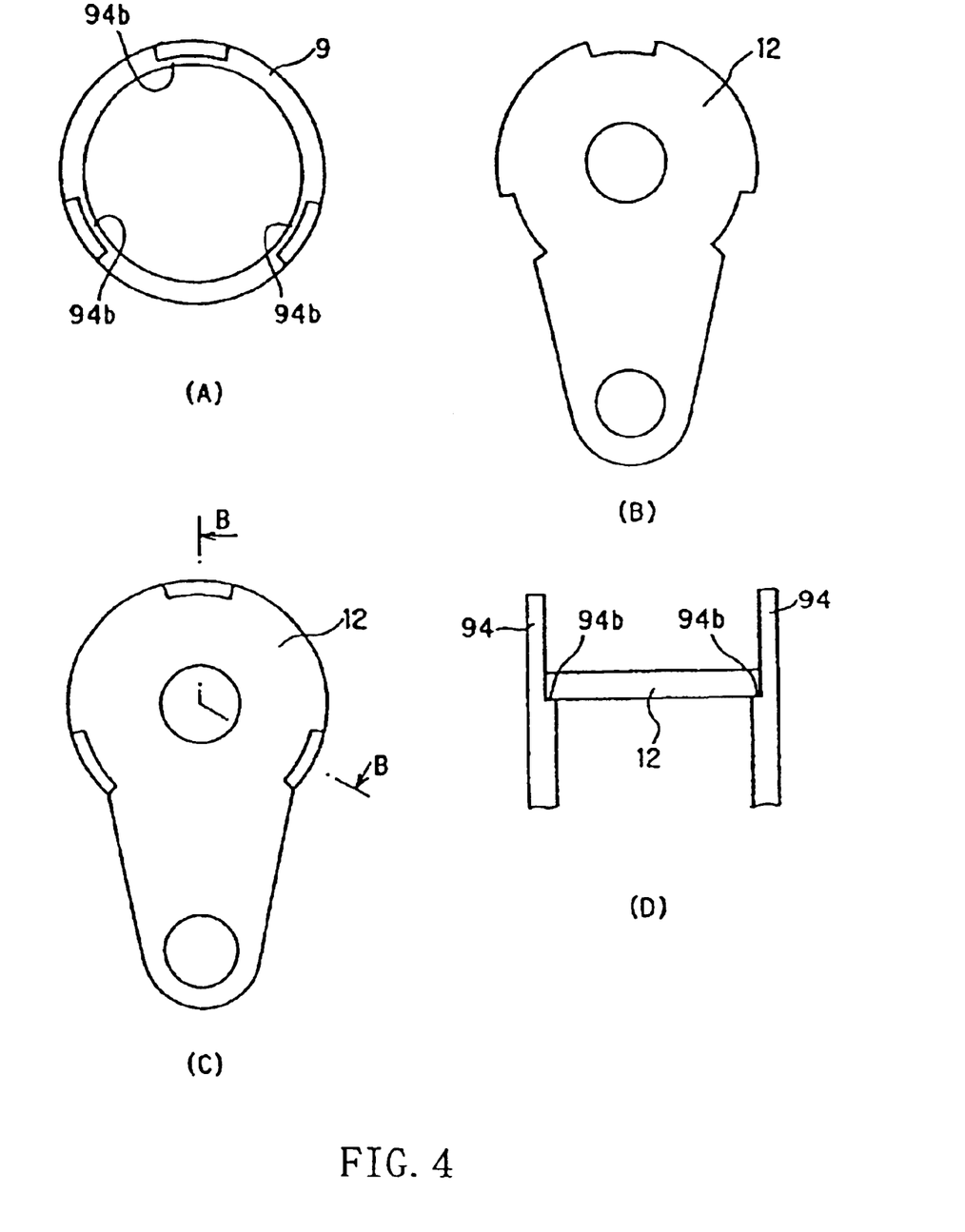
FIG. 4 is a schematic view showing a modification of the configuration of FIG. 3.
Figure 5:
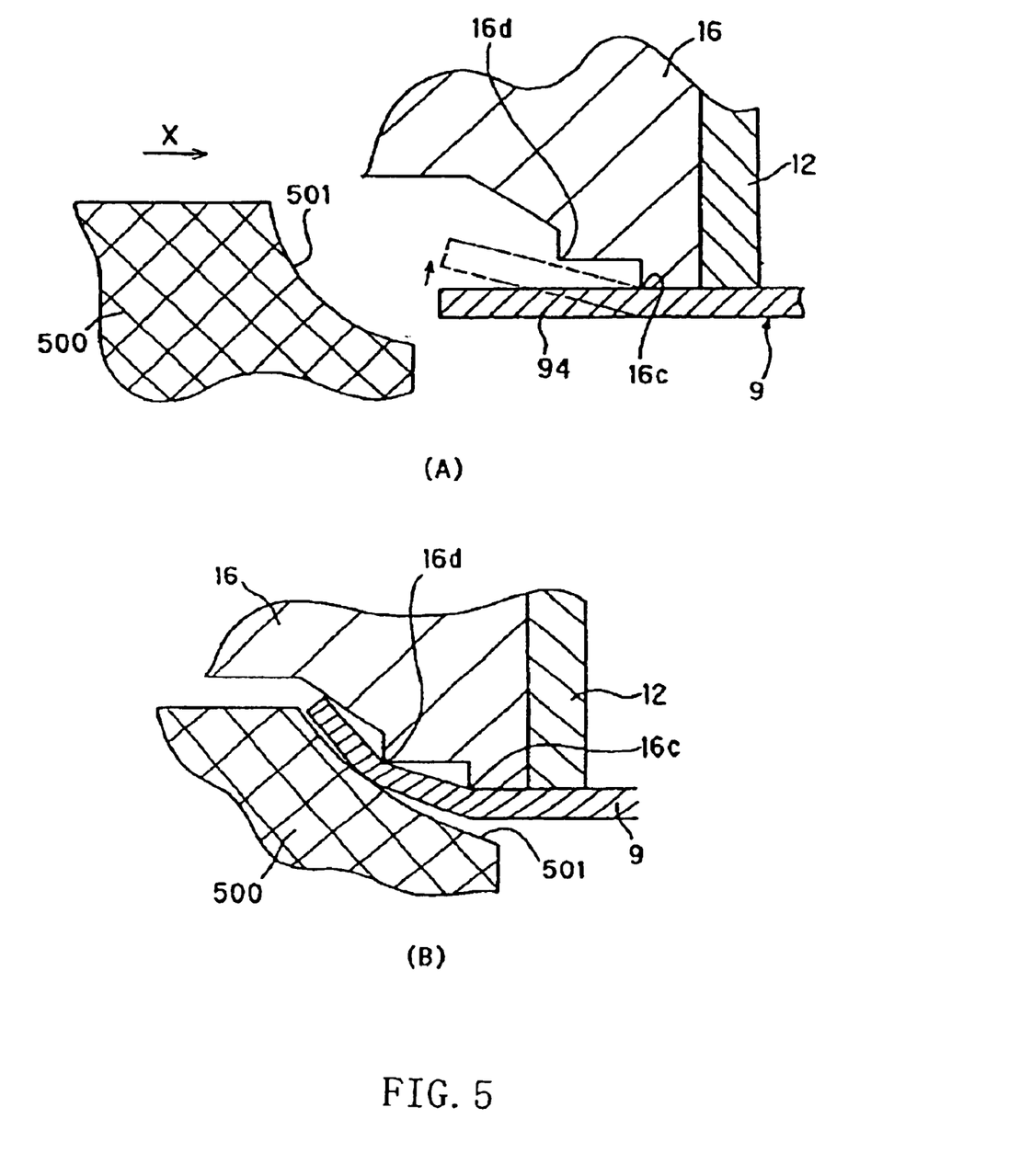
FIG. 5 is a schematic view illustrating the caulking process.
Figure 6:
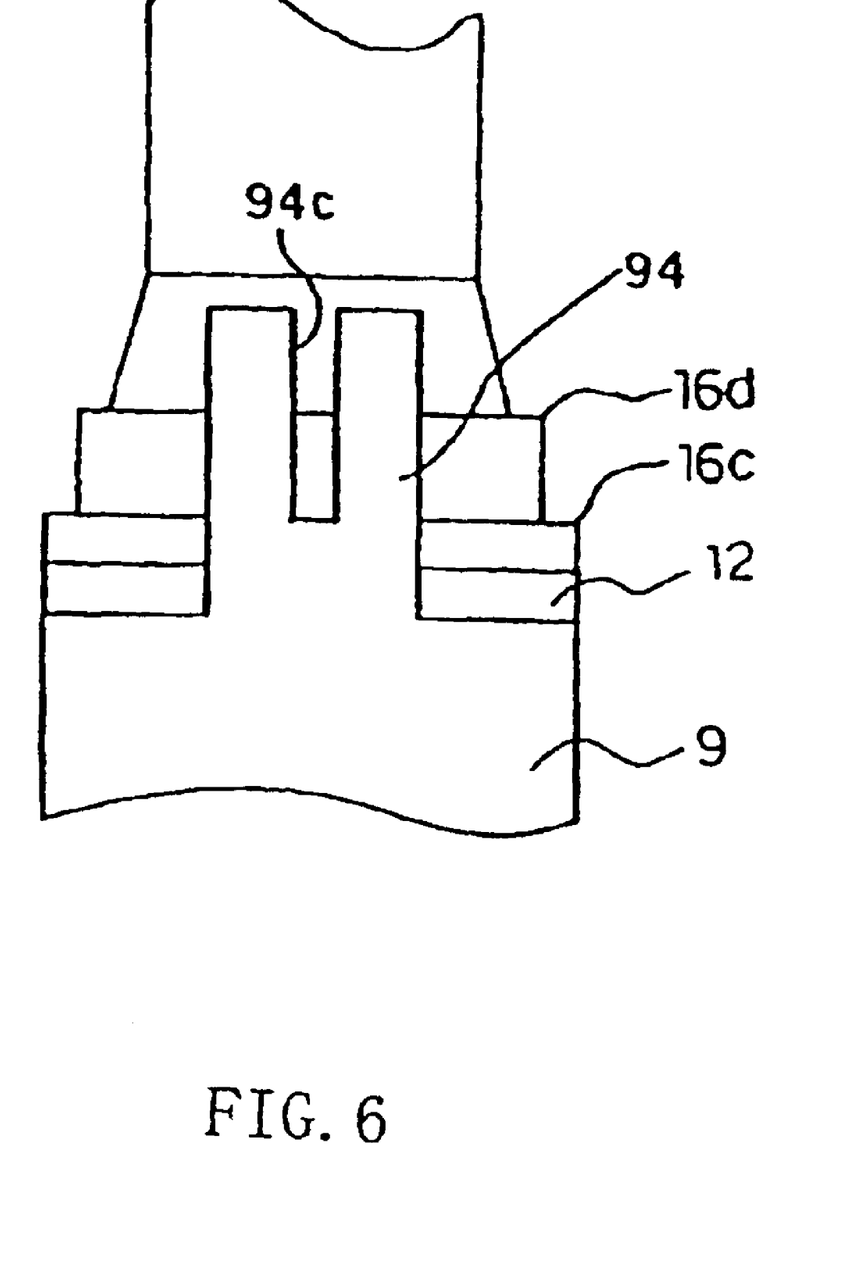
FIG. 6 is a schematic view illustrating a preferred embodiment of a projection for caulking.

FIG. 3 is a schematic view illustrating mounting of the casing member and the bracket plate ((A) is a schematic plan view of the casing member, (B) is a schematic plan view of the bracket plate, (C) is a schematic plan view showing a state, in which the bracket plate is mounted to the casing member, and (D) shows an AA cross section in (C)), FIG. 4 shows a modification of that shown in FIG. 3 ((A) is a schematic plan view of the casing member, (B) is a schematic plan view of the bracket plate, (C) is a schematic plan view showing a state, in which the bracket plate is mounted to the casing member, and (D) shows a BB cross section in (C)), FIG. 5 is a schematic view illustrating the caulking process, and FIG. 6 is a schematic view illustrating a preferred embodiment of the projection for caulking.

As shown in FIG. 3(A), a plurality of notches (three notches in an example shown) are provided on an end of the cylindrical-shaped casing member 9 and non-notched portions are made to serve as projections 94 for caulking. In addition, both end surfaces of tip ends of the projections 94 for caulking and bottom surfaces of the notches correspond to "end edges on one end side of a casing".

Accordingly, an inner peripheral surface 94a of the projections 94 for caulking is curved.

Meanwhile, a plurality (three in an example shown) of notched grooves are formed on the bracket plate 12 as shown in FIG. 3(B) to correspond to the projections 94 for caulking, and groove bottoms 12a of the notched grooves, which constitute an outer peripheral surface, are curved to follow a curved surface shape of the inner peripheral surface 94a of the projections 94 for caulking.

Accordingly, when the projections 94 for caulking are fitted into the notched grooves of the bracket plate 12 as shown in FIGS. 3(C) and 3(D), the inner peripheral surface 94a of the projections 94 for caulking and the outer peripheral surface (portions of the groove bottoms 12a) of the bracket plate 12 are put in a state, in which the associated surfaces abut against each other as a whole.

Also, although not specifically shown, at least a part of the outer peripheral surface of the stepped portion 16a of the valve sleeve 16, which constitutes a caulked portion, is curved to extend along the curved surface shape of the inner peripheral surface 94a of the projections 94 for caulking, so that the associated surfaces similarly abut against each other as a whole.

In this manner, a diametrical backlash of the bracket plate 12 and the valve sleeve 16 relative to the casing member 9 can be prevented (prevent out of centering) by performing caulking in a state, in which the curved, inner peripheral surface 94a of the projections 94 for caulking is caused to abut against and extend along at least parts of the outer peripheral surfaces of the bracket plate 12 and the valve sleeve 16.

Thereby, it is possible to prevent lateral forces acting on the plunger 1 from increasing by the center post 2 integral with the bracket plate 12 being made eccentric, so that it is possible to decrease hysteresis.

Also, even when the projections 94 for caulking causes some deformation, the valve sleeve 16 is fixed in a location distant from the bracket plate 12, whereby the casing is free of deformation in that portion thereof, in which the bracket plate 12 is positioned, and so the bracket plate 12 is positioned accurately. Accordingly, shaft deviation of the bearing can be decreased to enhance coaxiality.

Also, in the case where the bracket plate 12 is mounted to a different element (a device, on which the solenoid valve 100 is mounted), it is possible to enhance a positional accuracy with respect to the different element and a central position of the solenoid valve 100.

In addition, since an end of the spool 15 is spherical-shaped to abut against the rod 7 in the example shown, possible inclination between the solenoid section 100A and the valve section 100B can be accommodated to further decrease hysteresis.

Also, since the projections 94 for caulking are distributed equally in three locations in the example shown, caulking forces act uniformly toward a center when caulking is performed, so that it is possible to decrease shaft deviation.

Here, an explanation will be given to ratios, for which the projections 94 for caulking and the notches account, to a circumference.

Since caulking is performed in portions corresponding to the projections 94 for caulking, the projections 94 for caulking have an influence on strength of caulking, the larger a ratio, for which the projections 94 for caulking account, the more strength of caulking.

Meanwhile, since the notches support the bracket plate 12 and bear a load of caulking through the bracket plate 12, the larger a ratio, for which the notches account, the more an effect of prevention of deformation of the bracket plate 12.

Accordingly, the larger ratios, for which both the projections 94 for caulking and the notches account, to a circumference, the more an advantage, but it is necessary to take account of catching a balance between the projections 94 for caulking and the notches because the both constitute a whole circumference and one of them is made small when the other of them is made large.

In addition, while it is believed that when the casing member is increased in wall thickness, strength of caulking can be enhanced and an effect of prevention of deformation of the bracket plate 12 can be increased, it cannot be said that it suffices to increase the casing member in wall thickness, since the casing member is in some cases limited in wall thickness by a manufacture method, cost, product weight, or the like.

For example, while the casing member can be preferably manufactured by drawing in the embodiment, it becomes difficult to increase the wall thickness of the casing member to a predetermined extent or higher in the case where such manufacture method is adopted, and so thickness is restricted.

It has been found from the above that as a result of examination, a ratio, for which the projections 94 for caulking account, to a circumference be preferably ¼ or larger, and in particular, such ratio be more preferably ⅓ or larger.

Also, it has been found that a ratio, for which the notches account, to a circumference be preferably ¼ or larger.

Accordingly, it has been found that when these are simultaneously met, an adequate fixing force for caulking is obtained and deformation of the bracket plate can be prevented even in the case where a casing having a comparatively small wall thickness is used.

Also, while FIG. 3 shows an example, in which the whole wall in portions provided with no notches and on the end of the cylindrical-shaped casing member 9 constitutes the projections 94 for caulking, it is possible that only an outer peripheral side of a cylinder serves as a projection 94 for caulking and an abutting surface 94b, against which the bracket plate 12 abuts, remains on an inner peripheral side of the cylinder, as shown in FIG. 4.

Subsequently, an explanation will be given to a caulking jig (metallic die) and the behavior of a projection for caulking at the time of caulking with reference to FIG. 5.

FIG. 5 schematically shows a partially, cross sectional view of a jig (metallic die) for caulking, and a partially, cross sectional view of the casing member 9, bracket plate 12, and the stepped portion 16a of the valve sleeve 16, which constitutes a caulked portion, respectively, (A) showing a state at the start of caulking, and (B) showing a state at the termination of caulking.

As shown in the figure, a metallic die 500 for caulking comprises an abutting surface 501, which abuts against a tip end of the projection 94 for caulking to bend the projection 94 for caulking. The abutting surface 501 is inclined in a curved-surface manner.

When caulking is to be performed, the metallic die 500 is driven in a direction indicated by an arrow X in FIG. 5(A) in a state, in which the bracket plate 12 and the valve sleeve 16 are incorporated.

Thereby, the abutting surface 501 first abuts against a tip end of the projection 94 for caulking and drives the same in the direction X, whereby the tip end of the projection 94 for caulking is exerted by component forces toward the bracket plate 12 and radially inward.

Accordingly, the projection 94 for caulking is bent inside as indicated by an arrow in FIG. 5(A).

In this case, a first corner 16c provided on the stepped portion 16a of the valve sleeve 16, which constitutes a caulked portion, first restricts the projection 94 for caulking in a position, in which bending begins, so that the projection for caulking is bent at the first corner 16c as a starting point.

When the projection for caulking is bent further, it abuts against a second corner 16d provided on the stepped portion 16a of the valve sleeve 16, which constitutes a caulked portion, to press the second corner 16d to be bent to a position, in which the tip end of the projection 94 for caulking abuts against an inclined surface provided on the stepped portion 16a of the valve sleeve 16, which constitutes a caulked portion.

In this manner, the provision of the first corner 16c makes it possible to prescribe a position, in which the projection 94 for caulking is bent, and the second corner 16d is provided to be positively held toward the bracket plate 12 by the projection 94 for caulking, so that an adequate fixing force for caulking is obtained.

Also, it is general that when a caulking processing is performed, there is generated spring back, in which a tip end of a portion being caulked is a little returned to an original state by an elastic righting force of the portion itself.

More specifically, while the tip end of the projection 94 for caulking abuts against the inclined surface provided on the stepped portion 16a of the valve sleeve 16 in a state shown in FIG. 5(B), an elastic righting force of the projection itself produces spring back, so that the tip end of the projection is a little returned to a position distant from the inclined surface.

Since the second corner 16d remains in a held state in the embodiment even when the tip end separates, however, an adequate fixing force for caulking is maintained.

From the above, it is possible in the constitution of the embodiment to obtain an adequate fixing force for caulking even when a load of caulking is made comparatively small.

Also, a groove 94c is provided, as shown in FIG. 6, on the projection 94 for caulking in the embodiment. In this case, a depth of a bottom of the groove 94c is set to be positioned in the vicinity of the first corner (equivalent to or a little deeper than the position) on the stepped portion 16a of the valve sleeve 16, which constitutes a caulked portion.

Thereby, the projection 94 for caulking is lowered in rigidity and so made easy to be bent near the bottom of the groove 94c when caulking is performed, so that it is possible to prevent bulging near the root of the projection 94 for caulking. That is, the depth of the groove bottom prescribes a position, in which bending is effected at the time of caulking.

That is, since the projection 94 for caulking tends to be bent near the root thereof in the case where the groove 94c is not provided, there is a high possibility that bulging of inner and outer peripheral surfaces of the casing is generated near the outer peripheral surface of the bracket plate.

Such bulging is responsible not only for lowering of positional accuracies of the respective constituents but also for degradation in sealing performance since a crushing margin of the packing 10 for the casing member 9 is decreased. Hereupon, the provision of the groove 94c makes it possible to prevent such bulging.

Accordingly, it is possible to prevent deformation in outer diameter and to enhance coaxiality further.

As described above, since it suffices in the assembling work to insert or mount various members only in one direction relative to the casing member 9, the process of reversing the casing member in the assembling processing is unnecessary in contrast to the case where assembling is performed from the opposite directions as in the conventional art, so that it is possible to reduce manhour for assembly and to dissolve complexity in the assembling work. Also, it suffices to perform caulking only in one location.

Also, one end of the valve sleeve 16 and the bracket plate 12 are put between the projections 94 for caulking and an end edge of the casing member 9 by the above caulking, whereby the valve sleeve 16 and the bracket plate 12 are positioned and fixed, the stepped portion 17b of the connector member 17 is positioned relative to the bent portion 93, and other solenoid constituents are constrained by the connector member 17 and the bracket plate 12 to be positioned and fixed.

Here, the projections 94 for caulking applies a load of caulking on one end of the valve sleeve 16 at the time of caulking and the load of caulking is transmitted to the bracket plate 12. Since a surface of the bracket plate 12 on a side opposed to that side, on which the load is applied, abuts against the end edge of the casing member 9, only the casing member 9 is exerted by the load and other solenoid constituents received in the casing member 9 are not exerted by the load of caulking.

Accordingly, since the various solenoid constituents received in the casing member 9 are not exerted by the load of caulking, positional accuracies relative to one another are not adversely affected by caulking. Also, a burden taking account of a load of caulking on the various solenoid constituents is dissolved, and a burden is also reduced when dimensions and shapes of the various solenoid constituents are designed.

Also, specifically, in the case where an end of a connector member is conventionally caulked on a casing member, a wall thickness from a groove of a molding formed of a resin for mounting a seal member to an end surface must be made adequately large. In contrast, such wall thickness (L1 in FIG. 1) can be thinned because no load of caulking is applied in the embodiment.

Accordingly, it is possible to decrease dimensions in an axial direction and to achieve lightening and compactness.

Also, the casing member 9 is composed of a small-diameter portion 91 and a large-diameter portion 92 in the solenoid valve 100 according to the embodiment. This will be explained as follows.

First, an O-ring 19, which constitutes a seal member (seal ring), is brought into close contact with an inner peripheral surface of the small-diameter portion 91 and an end surface of the upper plate 11 abuts against the inner peripheral surface of the small-diameter portion to form a magnetic path between the inner peripheral surface and the upper plate 11, so that the small-diameter portion constitutes that portion, for which a comparatively strict demand for accuracy in inner diameter and accuracy in a surface state is made. In this case, the upper plate 11 is structured to be formed by a cylindrical portion and a flange, which is formed by bending one end portion of the cylindrical portion to a direction of diameter, and an end surface of the upper plate indicates an outer peripheral surface of a tip end of the flange.

Meanwhile, the large-diameter portion 92 constitutes that portion, for which a comparatively less demand for accuracy in inner diameter and the like is made. In addition, the packing 10 is brought into close contact with an inner peripheral surface of the large-diameter portion 92 and structured to be able to adequately function a sealing performance for dimensional dispersion, for which an explanation is omitted.

In this manner, a burden on manufacture can be decreased by reducing portions, for which dimensional accuracy is demanded.

Also, degradation in quality of the O-ring 19 can be prevented by setting an inner diameter of the large-diameter portion 92 to a magnitude, which obviates contact between an outer peripheral surface of the O-ring 19 and the large-diameter portion.

That is, the connector member 17 is inserted from an opening on the other end side of the casing member 9 in the case where assembling is made in the above manner, and such work of insertion is performed in a state, in which the O-ring 19 is mounted in a mount groove of the connector member 17, whereby the setting of the inner diameter of the large-diameter portion 92 on a side of insertion makes it possible to prevent the O-ring 19 from rubbing against the inner peripheral surface of the large-diameter portion 92 while the O-ring goes to the small-diameter portion 91 at the time of insertion. Therefore, degradation in quality of O-ring 19 can be prevented.

Subsequently, an explanation will be given to a preferable application of the solenoid valve 100 according to the embodiment.

In an engine for an automobile and etc. intake and exhaust valves of the engine are opened and closed in accordance with a rotation of a camshaft. When the timing of the valve is controlled suitably in accordance with the operating condition (high speed, low speed), the fuel efficiency can be improved, and a high exhaust gas purification can be obtained.

This control for valve timing can be done by changing a phase by shifting the camshaft in the rotational direction. The techniques for carrying out it by a solenoid valve are known as known techniques.

Here, in order to shift the camshaft in the rotational direction, a hydraulic pressure control by the solenoid valve is necessarily carried out. The solenoid valve is generally provided on a path of an engine oil flow passage in relation to spaces for installation and etc. and uses the engine oil.

Conventionally, control were separately carried out according to the two kinds of condition of a high-speed condition and a low-speed condition by using a solenoid valve adapted to carry out an ON-OFF control. However, in recent years, a solenoid valve capable of carrying out a linear control has come to be used so as to carry out a more highly accurate control.

Therefore, the solenoid valve according to the above-described embodiment of the present invention becomes possible to be used suitably as such a valve timing control (VTC) linear control solenoid valve.

Industrial Applicability

As described above, workability in assembling and quality are improved according to the invention.

What is claimed is:

1. A solenoid valve including a substantially cylindrical-shaped casing member having on one end side thereof a bent portion, which is bent inside,
   a connector member adapted to be inserted into a hollow interior of the casing member from other end side thereof, and having a stepped portion positioned on the bent portion, the connector member having a connector portion projecting outside from the one end side of the casing member,
   various solenoid constituents adapted to be sequentially inserted into the hollow interior of the casing member from other end side thereof after the connector member has been inserted, and
   a valve adapted to be mounted after the various solenoid constituents have been inserted, the solenoid valve being characterized by having projections for caulking, by which the valve and the various solenoid constituents are mounted in a state, in which the valve is mounted on the other end of the casing member.

2. The solenoid valve according to claim 1, wherein the valve is provided with a first corner for prescribing a position, in which the projections for caulking begin bending at the time of caulking, and a second corner adapted to be pressed by those inner peripheral surfaces of the projections for caulking, which are bent by the first corner.

3. The solenoid valve according to claim 2, wherein the projection for caulking is provided with a groove, which extends near the first corner from a tip end of the projection.

4. The solenoid valve according to claim 1, further comprising a bracket plate, in which a bracket for mounting a solenoid valve body to a different element, and a plate provided on a side of the valve for forming a magnetic path between the casing and the solenoid constituents are formed integrally, and
   wherein one end of a valve portion abuts against one surface of the bracket plate and a portion of an end edge of the casing on the other end side thereof abuts against the other surface of the bracket plate, and
   the projections for caulking effect assembling of the various solenoid constituents and the valve in a state, in which an inner peripheral surface of the casing extends along and abuts against at least a part of an outer peripheral, curved surface of the bracket plate, or in a state, in which the inner peripheral surface of the casing extends along and abuts against at least a part of an outer peripheral surface of the valve, or in a state, in which the inner peripheral surface of the casing extends along and abuts against both of at least a part of the outer peripheral, curved surface of the bracket plate and at least a part of the outer peripheral surface of the valve.

5. The solenoid valve according to claim 4, wherein the bracket plate and one end of the valve are put between the projections for caulking and a portion of an end edge of the casing on the other end side, whereby the various solenoid constituents, bracket plate and the valve are assembled.

6. The solenoid valve according to claim 1, further comprising a seal ring adapted to come into close contact with the inner peripheral surface of the casing on the one end side of the casing to effect sealing, and the casing comprising
- a small-diameter portion defined by a region, which is disposed on the one end side of the casing and includes a portion adapted to be closely contacted by the seal ring, and
- a large-diameter portion, which is disposed toward the other end from the small-diameter portion of the casing and does not contact with an outer peripheral surface of the seal ring.

7. The solenoid valve according to claim 6, wherein the casing comprises a cylindrical portion, of which an inner peripheral surface defines a substantially perfect circle, and the seal ring is mounted on an inner periphery of the cylindrical portion.

8. The solenoid valve according to claim 6, wherein the solenoid constituents include an upper plate, of which an end abuts against the inner peripheral surface of the casing and which forms a magnetic path, and an end of the upper plate abuts against an inner peripheral surface of the small-diameter portion of the casing.

* * * * *